(12) United States Patent
Miya et al.

(10) Patent No.: US 8,643,962 B2
(45) Date of Patent: Feb. 4, 2014

(54) LENS MOVING MECHANISM (71) Applicant: Hoya Corporation, Tokyo (JP)

(72) Inventors: Kota Miya, Saitama (JP); Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/721,869

(22) Filed: Dec. 20, 2012

(65) Prior Publication Data

US 2013/0176637 A1    Jul. 11, 2013

(30) Foreign Application Priority Data

Jan. 6, 2012   (JP) ................................. 2012-000949

(51) Int. Cl.
*G02B 7/02* (2006.01)
*G02B 15/14* (2006.01)

(52) U.S. Cl.
USPC ............................ 359/823; 359/696; 359/694

(58) Field of Classification Search
USPC .................... 359/694–704, 811–830
See application file for complete search history.

(56) References Cited

U.S. PATENT DOCUMENTS 5,987,262 A * 11/1999 Higuchi et al. ............... 396/144
6,650,488 B2 * 11/2003 Onda ............................ 359/823
7,099,088 B2 *  8/2006 Okuda ......................... 359/696

FOREIGN PATENT DOCUMENTS

JP    2004-053854    2/2004
JP    2009-192965    8/2009

OTHER PUBLICATIONS

U.S. Appl. No. 13/554,173 to Hiroshi Nomura, filed Jul. 20, 2012.

* cited by examiner

*Primary Examiner* — Mohammed Hasan
(74) *Attorney, Agent, or Firm* — Greenblum & Bernstein P.L.C.

(57) ABSTRACT

A lens moving mechanism includes a guide shaft extending in an optical axis direction and a lens frame. The lens frame includes a transfer portion which follows movement of the nut member, which is screw-engaged with a lead screw of a motor. An effective length of the guide shaft is greater than that of the lead screw so that an end of the guide shaft and the motor overlap each other. Part of the fit-on portion of the lens frame is positioned where the end of the guide shaft and the motor overlap each other when the lens frame is at a lens-frame moving end, and is positioned to face the lead screw in a direction orthogonal to the optical axis when the lens frame is at the opposite lens-frame moving end.

13 Claims, 8 Drawing Sheets

LENS MOVING MECHANISM

FIELD OF THE INVENTION

The present invention relates to a lens moving mechanism which moves a lens forward and reverse by a motor-driven lead screw mechanism.

DESCRIPTION OF THE RELATED ART

As a mechanism which moves a lens group of a camera in an optical axis direction, a mechanism which biases a lens frame in an optical axis direction and presses and moves this lens frame against the biasing force by rotating a motor-driven lead screw via a lead nut member, which is screw-engaged with the lead screw with being prevented from rotating, is known in the art. This mechanism is disclosed in Japanese Unexamined Patent Publication No. 2009-192965.

In this mechanism that is disclosed in the above-mentioned Japanese Unexamined Patent Publication No. 2009-192965, a spring is fitted on a guide shaft which guides the lens frame in the optical axis direction to bias a connecting portion of the lens frame, which is engaged with the guide shaft, in the optical axis direction.

In the lens moving mechanism disclosed in the above-mentioned Japanese Unexamined Patent Publication No. 2009-192965, it is desirable for this connecting portion to be great in length in the optical axis direction to prevent the lens frame (and a lens supported thereby) from tilting. However, if the connecting portion is formed to have a long length in the optical axis direction while maintaining the original moving range of the lens frame, the guide shaft inevitably becomes long, which becomes a cause of preventing the lens barrel from being downsized (miniaturized) in the optical axis direction.

Alternatively, if the connecting portion is formed to have a long length in the optical axis direction with the length of the guide shaft remaining unchanged, the length of the lead screw cannot be utilized effectively, and a sufficient moving range of the lens frame cannot be achieved.

SUMMARY OF THE INVENTION

The present invention has been devised in view of the above described problems with the related art and provides a lens moving mechanism using a lead screw and a nut that is screw-engaged with the lead screw and which makes it possible to achieve a reduction of the length of a lens barrel while securing a sufficient length of a fit-on portion (which is engaged with a guide shaft to be guided linearly) of a lens frame in an optical axis direction and effectively utilizing the length of the lead screw.

The lens moving mechanism according to the present invention has been accomplished due to the finding that space next to a motor having a lead screw is usable as space for movement of the lens frame fit-on portion.

According to an aspect of the present invention, a lens moving mechanism is provided, including a guide shaft which extends in an optical axis direction; a lens frame which is biased in the optical axis direction and includes a fit-on portion which is fitted onto the guide shaft; and a lead screw which is formed directly on a drive shaft of a motor, which is driven to rotate in accordance with control information, the lead screw extending parallel to the guide shaft; and a nut member which is screw-engaged with the lead screw while being prevented from rotating integrally with the lead screw, wherein the nut member moves forward and rearward in the optical axis direction relative to the lead screw in accordance with rotation of the lead screw. The lens frame includes a transfer portion which follows movement of the nut member. An effective length of the guide shaft is greater than an effective length of the lead screw so that an end of the guide shaft and the motor overlap each other in the optical axis direction. At least part of the fit-on portion of the lens frame is positioned at a position where the end of the guide shaft and the motor overlap each other in the optical axis direction when the lens frame is positioned at one of opposite ends of a moving range of the lens frame. The at least part of the fit-on portion of the lens frame is positioned to face the lead screw in a direction orthogonal to the optical axis when the lens frame is positioned at the other of the opposite ends of the moving range of the lens frame.

It is desirable for the fit-on portion to be greater in length in the optical axis direction than the transfer portion.

It is desirable for the transfer portion to include a motion transfer arm which is formed integral with the lens frame and has a hole into which the lead screw is loosely fitted. The motion transfer arm is in contact with the nut member.

It is desirable for the lens moving mechanism to include a transfer member guide shaft which extends parallel to the guide shaft, and an intermediate transfer member which is formed separately from the lens frame and movably guided in the optical axis direction by the transfer member guide shaft.

It is desirable for the intermediate transfer member to include a fit-on portion which is fitted on the transfer member guide shaft and extends in an axial direction thereof.

It is desirable for the transfer portion to be in contact with the intermediate transfer member and to follow the movement of the nut member.

It is desirable for the intermediate transfer member to be provided with a hole through which the lead screw is loosely fitted.

It is desirable for the intermediate transfer member to include a nut-incorporated intermediate transfer member with which the nut member is integrally formed, and for the transfer portion to be in contact with the nut-incorporated intermediate transfer member and to follow the movement of the nut-incorporated intermediate transfer member.

It is desirable for the nut-incorporated intermediate transfer member to include the nut member, a fit-on portion which is fitted on the transfer member guide shaft, and an deformable portion via which the nut member and the fit-on portion are connected to each other.

It is desirable for the deformable portion to be resiliently deformed in a direction orthogonal to the optical axis direction in which the nut member and the fit-on portion of the nut-incorporated intermediate transfer member move toward and away from each other.

It is desirable for the lens frame to support a rearmost lens group of a plurality of lens groups of a lens system, the rearmost lens group serving as a focusing lens group.

It is desirable for the motor to be fixed to a stationary member so that the lead screw extends forward.

It is desirable for the transfer member guide shaft to be positioned so that an end thereof and the motor overlap each other in the optical axis direction.

Since the lens moving mechanism according to the present invention is structured (designed) such that the effective length of the guide shaft is set to be greater than that of the lead screw so that one end of the guide shaft extends to a position beside the motor and that the fit-on portion of the lens frame is positioned on this extended end of the guide shaft when the lens frame is at one moving end or the other moving end of the lens frame, the fit-on portion of the lens frame can be made to move up to a space beside the motor, which makes it possible to secure a large moving range of the fit-on portion in the optical axis direction (a long distance through which the lens can move in the optical axis direction) even if the fit-on portion that is fitted on the guide shaft is set to have a long length in the axial direction thereof, which makes it possible to prevent the lens frame from tilting and to set up a large moving range of the lens frame in the optical axis direction.

The present disclosure relates to subject matter contained in Japanese Patent Application No. 2012-000949 (filed on Jan. 6, 2012) which is expressly incorporated herein by reference in its entirety.

BRIEF DESCRIPTION OF THE DRAWINGS

The present invention will be described below in detail with reference to the accompanying drawings in which.

DESCRIPTION OF THE EMBODIMENTS

Figure 1:
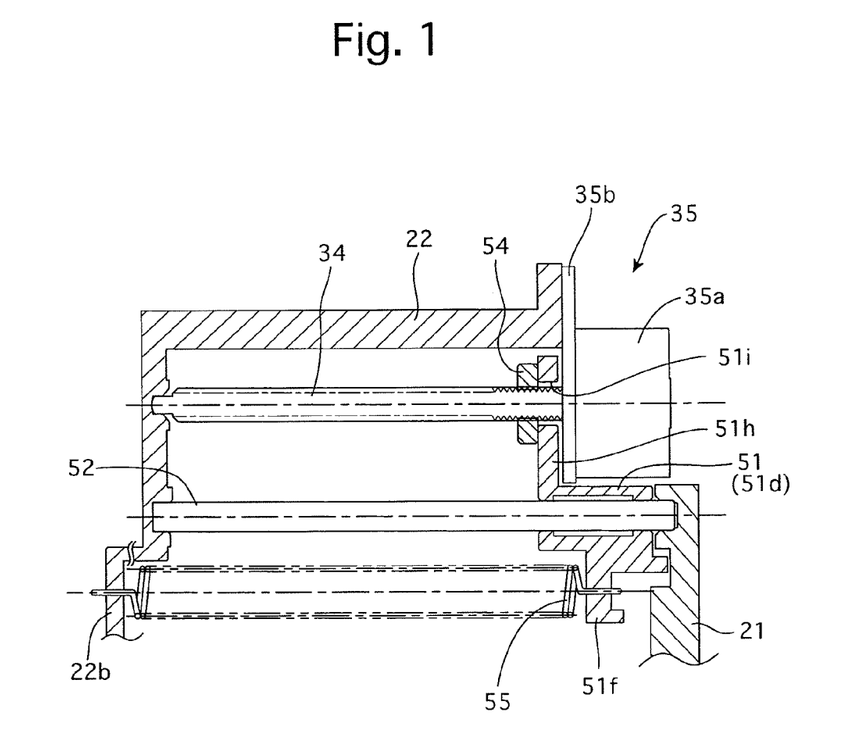
FIG. 1 is a cross sectional view of a main part of a first embodiment of a lens moving mechanism according to the present invention.
Figure 4:
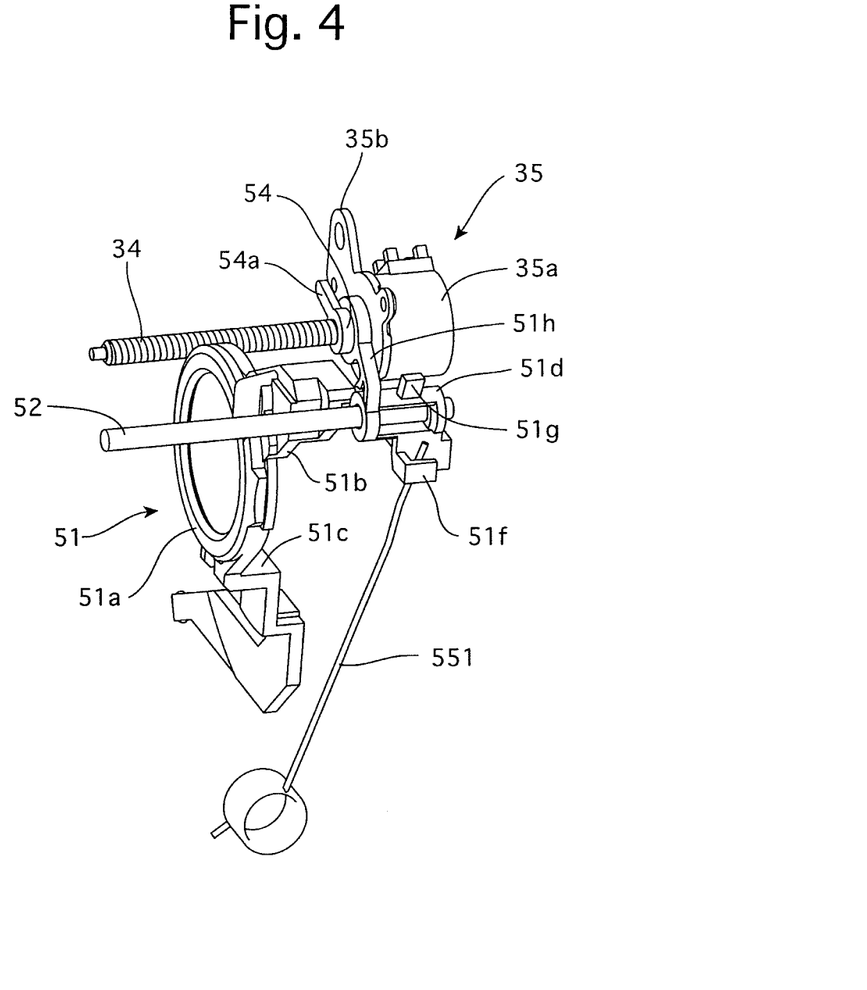
FIG. 4 is a perspective view of the main components of the first embodiment of the lens moving mechanism.
Figure 8:
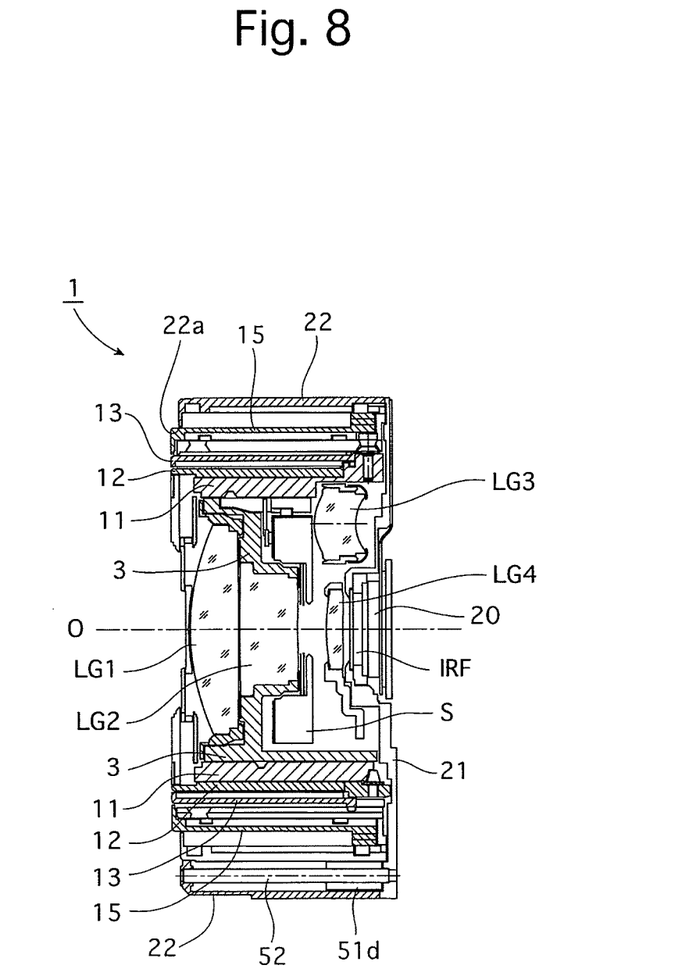
FIG. 8 is a cross sectional view of a zoom lens barrel equipped with a lens moving mechanism according to the present invention, showing the zoom lens barrel in a lens barrel accommodated state (fully-retracted state)
Figure 9:
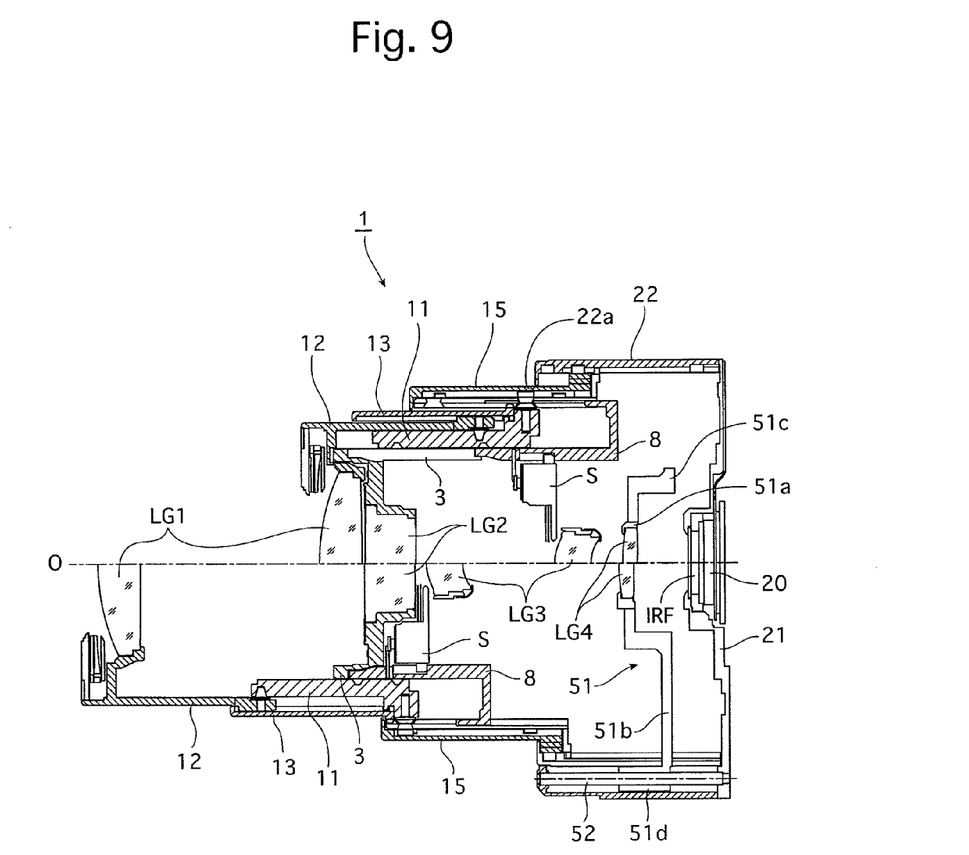
FIG. 9 is a cross sectional view of the zoom lens barrel shown in FIG. 8, showing the zoom lens barrel in a ready-to-photograph state.

FIGS. 8 and 9 show the overall structure of a zoom lens barrel 1 that is equipped with a lens moving mechanism according to the present invention. FIGS. 1 and 4 show a first embodiment of the lens moving mechanism. FIG. 8 shows the zoom lens barrel 1 in a lens barrel accommodated state (fully-retracted state), the upper half of the zoom lens barrel 1 in FIG. 9 shows a state of the zoom lens barrel 1 set at a wide-angle extremity, and the lower half of the zoom lens barrel 1 in FIG. 9 shows a state of the zoom lens barrel 1 set at a telephoto extremity.

The zoom lens barrel 1 is provided with a photographing optical system which includes a first lens group LG1, a second lens group LG2, a shutter (mechanical shutter) S that also serves as a diaphragm, a third lens group LG3, a fourth lens group LG4, an IR cut filter and a CCD image sensor (image-pickup device) 20, in that order from the object side (see FIG. 8). This photographing optical system is configured as a zoom optical system, in which the focal length is variable. A focal-length varying operation (zooming operation) is performed by moving the first lens group LG1, the second lens group LG2 and the third lens group LG3 along a photographing optical axis O of the photographing optical system in a predetermined moving manner. A focusing operation is carried out by moving the fourth lens group LG4 along the photographing optical axis O. In the illustrated embodiment, the present invention has been applied to the lens moving mechanism for the fourth lens group LG4. In the following descriptions, the optical axis direction refers to a direction along (on) the photographing optical axis O or a direction parallel to the photographing optical axis O, and forward and rearward refer to as forward (object side) and rearward (image plane side) directions in the optical axis direction, respectively.

The zoom lens barrel 1 is provided with a stationary barrel (stationary member) 22 which supports the optical system, from the first lens group LG1 to the fourth lens group LG4, inside the stationary barrel 22 to allow these lens groups to move in the optical axis direction. The zoom lens barrel 1 is provided with a lens barrel back plate 21 which is fixed to the back of the stationary barrel 22. The lens barrel back plate 21 holds a CCD image sensor 20 and the IR cut filter.

A zoom mechanism (lens moving mechanism) of the zoom lens barrel 1 will be briefly discussed hereinafter. The zoom lens barrel 1 is provided with a first advancing barrel 15 which advances from and retracts into an opening 22a of the stationary barrel 22. The first advancing barrel 15 is driven to rotate by a motor (not shown), and moves forward and rearward in the optical axis direction while rotating relative to the stationary barrel 22 via a cam mechanism. The zoom lens barrel 1 is provided radially inside the first advancing barrel 15 with a second advancing barrel 13 and a third advancing barrel 12 in that order from the first advancing barrel 15 side. A rotation of the first advancing barrel 15 causes the second advancing barrel 13 and the third advancing barrel 12 to move forward and rearward in the optical axis direction. The first lens group LG1 is supported by the third advancing barrel 12. The zoom lens barrel 1 is provided radially inside the third advancing barrel 12 with a cam ring 11 and a second lens group frame 3, in that order from the third advancing barrel 12 side. A rotation of the first advancing barrel 15 causes the cam ring 11 to move in the optical axis direction while rotating. The second lens group frame 3 moves linearly and supports the second lens group LG2. The positions of the third advancing barrel 12 (the first lens group LG1) and the second lens group frame 3 (the second lens group LG2) are controlled by cams formed on the cam ring 11.

The zoom lens barrel 1 is provided radially inside the first advancing barrel 15 with a third lens group frame 8 which holds the shutter S and the third lens group LG3. The third lens group frame 8 that supports the shutter S and the third lens group LG3 is supported to be movable in the optical axis direction relative to the first advancing barrel 15. A swingable frame (not shown) which supports the third lens group LG3 is supported by the third lens group frame 8 to be rotatable about a shaft (not shown) positioned off (offset from) the photographing optical axis O. The third lens group LG3 is positioned on an optical axis of the other lens groups LG1, LG2 and LG4 (i.e., on the photographing optical axis O) when the zoom lens barrel 1 is in a ready-to-photograph state, whereas the third lens group LG3 is offset from (removed from) a position on this optical axis when the zoom lens barrel 1 is in the lens barrel accommodated state.

The zoom lens barrel 1 is provided with a fourth lens group frame 51 which holds the fourth lens group LG4. The fourth lens group frame 51 is provided with a central lens holding portion 51a and a pair of guide arm portions 51b and 51c which are formed to extend from the central lens holding portion 51a in substantially opposite radial directions with respect to the photographing optical axis O (see FIG. 4). The guide arm portion 51b is provided at the radially outer end thereof with a cylindrical guide portion (fit-on portion) 51d into which a fourth lens group guide shaft 52 is inserted to be slidable relative to the cylindrical guide portion 51d, and the radially outer end of the guide arm portion 51c is engaged into a groove, formed in the inner surface of the stationary barrel 22, to be slidable therealong. The fourth lens group guide shaft 52 is fixed at the front and rear ends thereof to the stationary barrel 22 and the lens barrel back plate 21, respectively. The fourth lens group frame 51 is provided with a spring hook 51f, and an end of an extension spring (extension coil spring) 55 is hooked onto the spring hook 51f (see FIG. 1). The other end of the extension spring 55 is hooked on an engaging portion 22b formed on the stationary barrel 22. The extension spring 55 biases the fourth lens group frame 51 forward in the optical axis direction.

FIG. 4 shows a perspective view of the main components of the first embodiment shown in FIG. 1, however, the extension spring 55 is replaced by a torsion spring (torsion coil spring) 551. The coiled portion of the torsion spring 551 is supported by the stationary barrel 22, one of the two arms of the torsion spring 551 is engaged with the stationary barrel 22 and the other arm of the torsion spring 551 is hooked onto the spring hook 51f so that the torsion spring 551 biases the fourth lens group LG4 forward in the optical axis direction. The remaining components of the lens moving mechanism are the same as those shown in FIG. 1. Hereinafter, both the extension spring 55 and the torsion spring are referred to as a spring 55.

A motor 35 with a lead screw (drive shaft) 34, which is parallel to the fourth lens group guide shaft 52 and driven to rotate in accordance with control information output from a controller (not shown), is fixed to the stationary barrel 22 and the lens barrel back plate 21 therebetween (note that the motor 35 is an in-line type, in which a drive shaft thereof is provided as the lead screw 34). The fourth lens group guide shaft 52 and the lead screw 34 are for moving the fourth lens group frame 51 forward and rearward in the optical axis direction in accordance with object distance information, and the fourth lens group frame 51 is provided with a motion transfer arm (transfer portion) 51h and a screw insertion hole 51i (see FIGS. 1 and 4). The motion transfer arm 51h extends radially from the cylindrical guide portion 51d, and the screw insertion hole 51i is formed through the end of the motion transfer arm 51h so that the lead screw 34 is inserted (loosely fitted) into the screw insertion hole 51i.

The lead screw 34 and the fourth lens group guide shaft 52 are positioned radially outside the first advancing barrel 15. The cylindrical guide portion 51d is provided with an origin detection projection 51g which projects in a radial direction of the cylindrical guide portion 51d to detect the position (origin) of the fourth lens group frame 51 in the optical axis direction in cooperation with an origin sensor (not shown) fixed to the stationary barrel 22. The position (origin) of the fourth lens group frame 51 in the optical axis direction can be detected by detecting the position (origin) of the origin detection projection 51g in the optical axis direction by the origin sensor.

A lead nut member (nut member) 54 is screw-engaged with the lead screw 34 to be positioned in front of the motion transfer arm 51h (see FIG. 1). The lead nut member 54 is provided with an anti-rotation radial projection 54a (see FIG. 4) and is prevented from rotating integrally with the lead screw 34 by engagement of the anti-rotation radial projection 54a in a linear groove (not shown) formed on the stationary barrel 22. The motor 35 is provided with a fixed motor bracket 35b which is integral with a motor casing 35a of the motor 35, and the fixed motor bracket 35b is fixed to the stationary barrel 22 so as to make the lead screw 34 extend forward from the motor casing 35a. This arrangement, in which the motor casing 35a and the lead screw 34 are positioned at the rear and the front of the lens moving mechanism, respectively, is advantageous for miniaturization of the zoom lens barrel 1 because the motor casing 35a that is relatively large in size is positioned rearwardly compared with a comparative arrangement in which the lead screw 34 extends rearward from the motor casing 35a which is positioned at the front of the lens moving mechanism. In addition, since a motor, a sensor and the like are arranged at the back of the stationary barrel 22 (in a rear space of the camera) (this arrangement is not shown in the drawings), the shape of electrical wiring (flexible wiring board) for connecting these elements can be simplified. Furthermore, the motor 35 can be installed in the stationary barrel 22 from the rear side of the stationary barrel 22, which facilitates assembly. It is possible for the motor 35 to be positioned in the front part of the camera so that the lead screw 34 extends rearwardly; however, if the motor 35 and components are positioned in the front part of the camera, installation space for terminals, wiring, etc., needs to be secured, which may adversely affect the exterior design of the camera. If the motor 35 is positioned in the rear part of the camera (in the rear part of the stationary barrel 22) as in the case of the present embodiment, the contour of the front of the zoom lens barrel 1 becomes simple, which does not limit the exterior design of the camera.

The fourth lens group frame 51 is biased forward in the optical axis direction by the spring 55 or 551 simply with the cylindrical guide portion 51d fitted on the fourth lens group guide shaft 52 to be slidable thereon, and the fourth lens group frame 51 is movable rearward in the optical axis direction against the biasing force of the spring 55 or 551. Accordingly, the motion transfer arm 51h and the lead nut member 54 remain engaged with each other at all times by the spring force of the spring 55 or 551 in a state where no external force is exerted on the fourth lens group frame 51 (see FIGS. 1 and 4), whereas the fourth lens group frame 51 is movable so as to move the motion transfer arm 51h away from the lead nut member 54 when a rearward external force in the optical axis direction is exerted on the fourth lens group frame 51. In addition, a linear movement of the lead nut member 54 in the optical axis direction which is caused by a rotation of the lead screw 34 causes the fourth lens group frame 51 to move linearly in the optical axis direction with the lead nut member 54. The positions of the motion transfer arm 51h and the lead nut member 54 in the forward/rearward direction can be reversed so that the motion transfer arm 51h is biased rearward in the optical axis direction by a spring.

To make the effective length of the fourth lens group guide shaft 52 (i.e., the distance through which the cylindrical guide portion 51d can move in the optical axis direction) become greater than the effective length of the lead screw 34 (i.e., the distance through which the lead nut member 54 can move in the optical axis direction), the fourth lens group guide shaft 52 is arranged (extended) so that an end (the rear end) of the fourth lens group guide shaft 52 and the motor 35 (the motor casing 35a) face each other in a direction orthogonal to the photographing optical axis O, i.e., so that an end (the rear end) of the fourth lens group guide shaft 52 and the motor 35 (the motor casing 35a) overlap each other in the optical axis direction. In addition, the cylindrical guide portion 51d of the fourth lens group frame 51 is positioned at a position where an end (the rear end) of the fourth lens group guide shaft 52 and the motor 35 overlap each other in the optical axis direction when the fourth lens group frame 51 is positioned at the rearward movement limit thereof in the optical axis direction, and the cylindrical guide portion 51d of the fourth lens group frame 51 is positioned to face the lead screw 34 in a direction orthogonal to the photographing optical axis O when the fourth lens group frame 51 is positioned at the forward movement limit thereof. If the effective length of the fourth lens group guide shaft 52 is arranged to be extended to a position beside the motor 35 in this manner, the cylindrical guide portion 51d of the fourth lens group frame 51 can be moved to a position where the fourth lens group guide shaft 52 overlaps the motor 35 in the optical axis direction, which makes it possible to secure a long distance through which the cylindrical guide portion 51d (the fourth lens group LG4) can move in the optical axis direction even if the cylindrical guide portion 51d which is fitted on the fourth lens group guide shaft 52 has a long length in the axial direction thereof. Namely, the fourth lens group frame 51 can be prevented from tilting, and the distance through which the fourth lens group frame 51 can move in the optical axis direction can be set long.

Operations of the above described first embodiment of the lens moving mechanism will be discussed hereinafter. In the lens barrel accommodated state shown in FIGS. 1 and 8, the length of the optical system in the optical axis direction (the distance from the front surface (object-side surface) of the first lens group LG1 to the imaging surface of the CCD image sensor 20) is at a minimum length. In the lens barrel accommodated state, upon a main switch (not shown) of the camera to which the zoom lens barrel 1 is mounted being turned ON, a zoom motor (not shown) is driven in the lens barrel advancing direction. This causes the first advancing barrel 15 to move forward in the optical axis direction. The zoom motor continuously rotates in the lens barrel advancing direction and stops rotating upon the first advancing barrel 15 reaching a normal photographing position thereof (see the upper half of the cross sectional view in FIG. 9). In FIG. 9, the upper half of the zoom lens barrel 1 shows the zoom lens barrel 1 at a wide-angle extremity (i.e., at the shortest focal length), and the lower half of the zoom lens barrel 1 shows the zoom lens barrel 1 at a telephoto extremity (i.e., at the longest focal length).

Upon the camera commencing to perform an AF operation in a normal photographing position (ready-to-photograph state), the lead screw 34 of the motor 35 is driven to rotate by an angle (amount) of rotation according to object distance information; this rotation causes the lead nut member 54 to move linearly, and the fourth lens group frame 51 follows this movement of the lead nut member 54. This relationship between the lead nut member 54 and the fourth lens group frame 51 is maintained during the time the spring force of the spring 55 or 551 is the only external force which is exerted on the fourth lens group frame 51. Specifically, in the AF operation, when the lead screw 34 of the motor 35 is driven to rotate, the fourth lens group frame 51 moves in the optical axis direction following the lead nut member 54, and the cylindrical guide portion 51d is positioned beside the lead screw 34 when the fourth lens group frame 51 moves fully forward, and at least part of the cylindrical guide portion 51d is positioned at a position where an end (the rear end) of the fourth lens group guide shaft 52 and the motor 35 overlap each other in the optical axis direction when the fourth lens group frame 51 moves fully rearward.

Whereas, upon the main switch being turned OFF, the motor 35 rotates in a direction to move the fourth lens group LG4 rearward so that the fourth lens group LG4 moves to the rearward movement limit thereof in the range of driving of the fourth lens group LG4 by the lead screw 34, and thereafter the zoom motor rotates in the lens-barrel retracting direction, which causes the first advancing barrel 15 to move rearward (see FIG. 8). FIGS. 1 and 8 show a lens barrel accommodated state of the zoom lens barrel 1, in which the fourth lens group frame 51 is positioned at the limit of rearward movement thereof in the optical axis direction. In this lens-barrel accommodated state, the cylindrical guide portion 51d is positioned on an extension portion of the fourth lens group guide shaft 52 which is positioned beside the motor 35.

Figure 5:
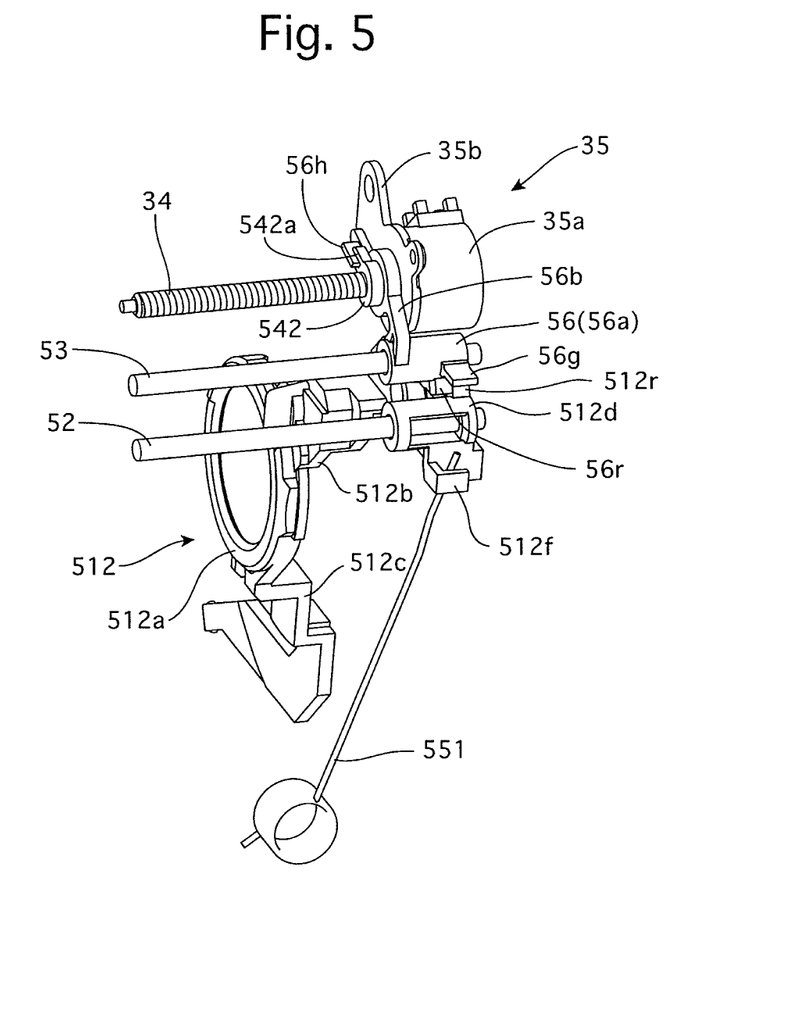
FIG. 5 is a perspective view of the main components of the second embodiment of the lens moving mechanism.

A second embodiment of the lens moving mechanism according to the present invention will be hereinafter discussed with reference to FIGS. 2 and 5. The second embodiment of the lens moving mechanism is different from the first embodiment of the lens moving mechanism in that an intermediate transfer member 56 is interposed between a lead nut member 542 that is screw-engaged with the lead screw 34 and a fourth lens group frame 512 to transfer motion of the lead nut member 542 in the optical axis direction to the fourth lens group frame 512 via the intermediate transfer member 56. Elements of the second embodiment of the lens moving mechanism which are identical to those of the first embodiment of the lens moving mechanism are designated by the same reference numerals, and the description of such elements is omitted from the following description.

The fourth lens group frame 512 that holds the fourth lens group LG4 is provided with a central lens holding portion 512a and a pair of guide arm portions 512b and 512c which are formed to extend from the central lens holding portion 512a in substantially opposite radial directions with respect to the photographing optical axis O. The guide arm portion 512b is provided at the radially outer end thereof with a cylindrical guide portion (fit-on portion) 512d into which a fourth lens group guide shaft 52, which is fixed between the stationary barrel 22 and the lens barrel back plate 21, is inserted to be slidable relative to the cylindrical guide portion 512d. The radially outer end of the guide arm portion 512c is engaged into a groove, formed in the inner surface of the stationary barrel 22, to be slidable therealong. The fourth lens group frame 512 is provided with a spring hook 512f (see FIG. 2), and an end of an extension spring 55 is hooked on the spring hook 512f. The other end of the extension spring 55 is hooked on an engaging portion 22b formed on the stationary barrel 22. The extension spring 55 biases the fourth lens group frame 51 forward in the optical axis direction. FIG. 5 shows a perspective view of the main components of the second embodiment shown in FIG. 2, however, the extension spring 55 is replaced by a torsion spring (torsion coil spring) 551 so that the fourth lens group frame 512 is biased forward in the optical axis direction by the torsion spring 551. The remaining components of the lens moving mechanism are the same as those shown in FIG. 2.

The second embodiment of the lens moving mechanism is provided with a transfer member guide shaft 53 which is fixed to the stationary barrel 22 and the lens barrel back plate 21 therebetween to extend parallel to the fourth lens group guide shaft 52 and the lead screw 34. The intermediate transfer member 56 is provided with a cylindrical guide portion (fit-on portion) 56a, a motion transfer arm 56b and a screw insertion hole 56c (see FIGS. 2 and 5). The transfer member guide shaft 53 is inserted into the cylindrical guide portion 56a to be slidable relative to the cylindrical guide portion 56a, the motion transfer arm 56b extends radially from the cylindrical guide portion 56a, and the screw insertion hole 56c is formed through the end of the motion transfer arm 56b so that the lead screw 34 is inserted (loosely fitted) into the screw insertion hole 56c.

The lead screw 34, the fourth lens group guide shaft 52 and the transfer member guide shaft 53 that linearly guides the intermediate transfer member 56 are positioned radially outside the first advancing barrel 15. The intermediate transfer member 56 is further provided with an origin detection projection 56g which projects in a radial direction of the cylindrical guide portion 56a to detect the position (origin) of the intermediate transfer portion 56 in the optical axis direction in cooperation with an origin sensor (not shown) fixed to the stationary barrel 22. The position (origin) of the fourth lens group frame 512 in the optical axis direction can be detected by detecting the position (origin) of the origin detection projection 56g (the intermediate transfer portion 56) in the optical axis direction by the origin sensor.

Figure 2:
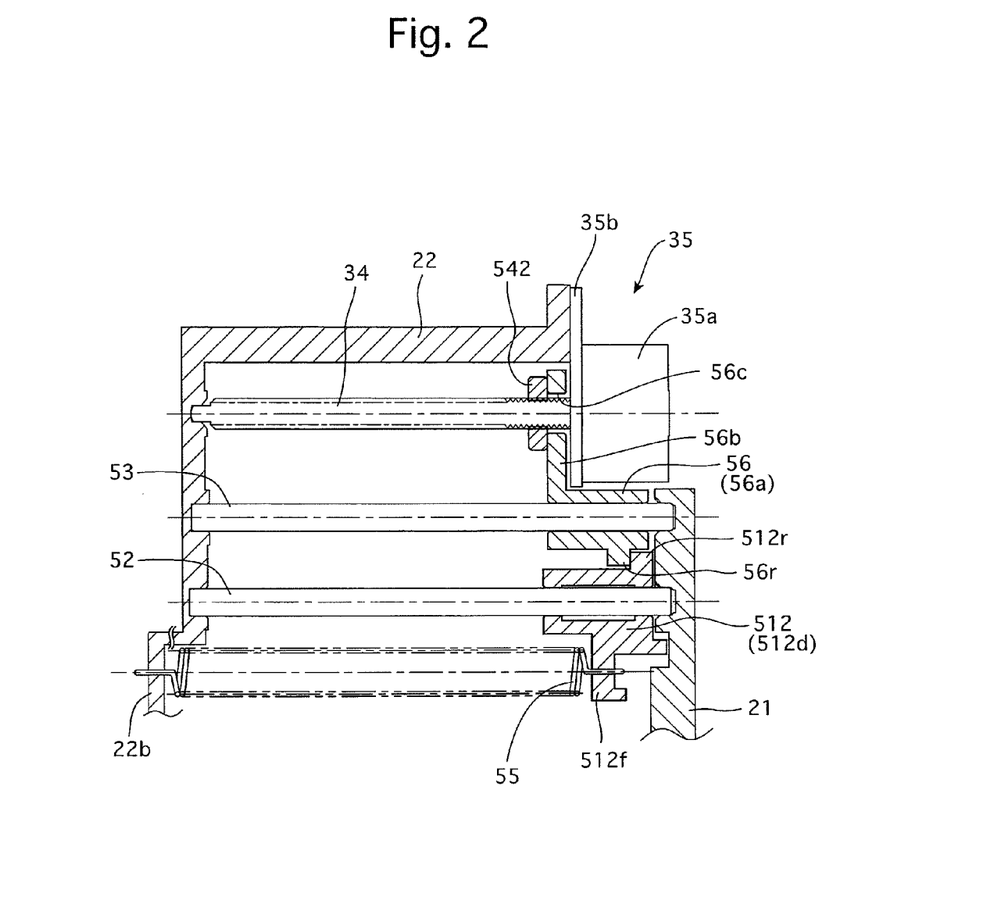
FIG. 2 is a cross sectional view of a main part of a second embodiment of the lens moving mechanism according to the present invention.

A lead nut member (nut member) 542 is screw-engaged with the lead screw 34 to be positioned in front of the motion transfer arm 56b (see FIG. 2). The lead nut member 542 is provided with an anti-rotation radial projection 542a (see FIG. 5) and is prevented from rotating by engagement of the anti-rotation radial projection 542a with an anti-rotation radial projection 56h of the intermediate transfer member 56.

The fourth lens group frame 512 is biased forward in the optical axis direction by the spring 55 or 551 simply with the cylindrical guide portion 512d fitted on the fourth lens group guide shaft 52 to be slidable thereon, and the fourth lens group frame 512 is movable rearward in the optical axis direction against the biasing force of the spring 55 or 551. The fourth lens group frame 512 and the intermediate transfer member 56 are provided with a one-way linkage projection (transfer portion) 512r and a one-way linkage projection 56r, respectively, which come into contact with each other by the forward-movement biasing force of the spring 55 or 551 that is applied to the fourth lens group frame 512. The one-way linkage projection 512r and the one-way linkage projection 56r remain engaged with each other at all times by the spring force of the spring 55 or 551 in a state where no external force is exerted on the fourth lens group frame 512 (see FIGS. 2 and 5), whereas the fourth lens group frame 512 is movable independently of the intermediate transfer member 56 when a rearward external force in the optical axis direction is exerted on the fourth lens group frame 512. In addition, in a state where no external force is exerted on the fourth lens group frame 512, the intermediate transfer member 56 is continuously biased by the spring 55 or 551 in a direction to make the motion transfer arm 56b come in contact with the lead nut member 542, and a linear movement of the lead nut member 542 in the optical axis direction which is caused by a rotation of the lead screw 34 causes the intermediate transfer member 56 to move linearly in the optical axis direction with the lead nut member 542, and the fourth lens group frame 512 moves in the optical axis direction following this movement of intermediate transfer member 56.

As described above, in the second embodiment of the lens moving mechanism, the transfer portion that follows the movement of the nut member 542 is configured from the one-way linkage projection 512r, which comes into contact with the one-way linkage projection 56r of the intermediate transfer member 56 that is provided separately from the fourth lens group frame 512 and movably guided in said optical axis direction by the transfer member guide shaft 53 that is parallel to the fourth lens group guide shaft 52, and accordingly, it is possible for only the fourth lens group frame 512 to be removed with no need to remove the motor 35 and other surrounding components when the fourth lens group LG4 is replaced by another fourth lens group after the zoom lens barrel 1 is assembled.

Figure 3:
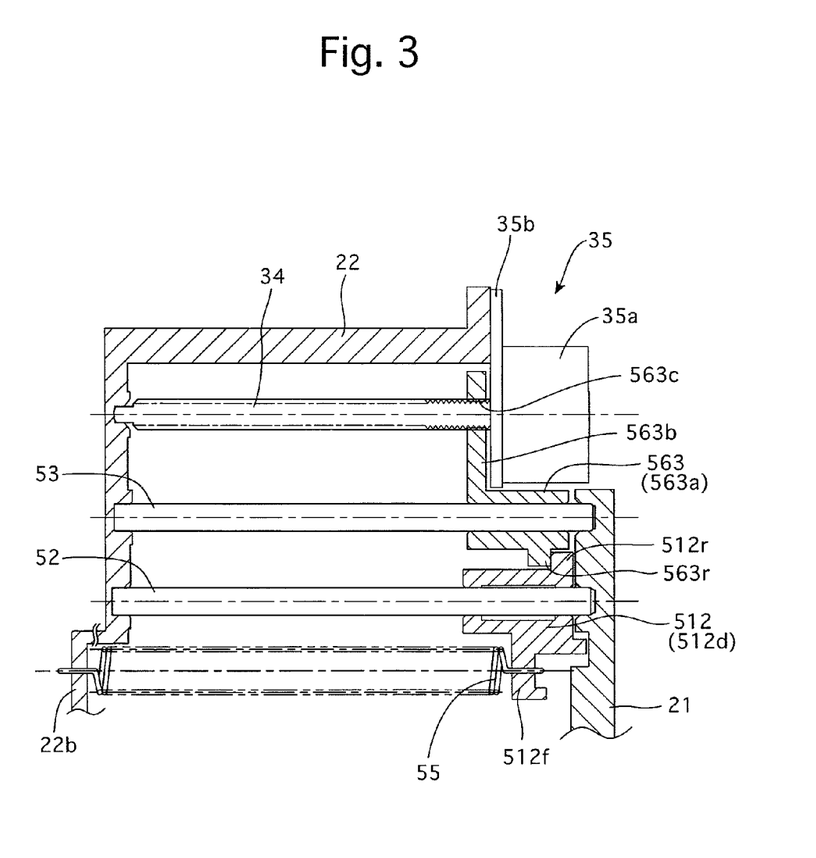
FIG. 3 is a cross sectional view of a main part of a third embodiment of the lens moving mechanism according to the present invention.
Figure 6:
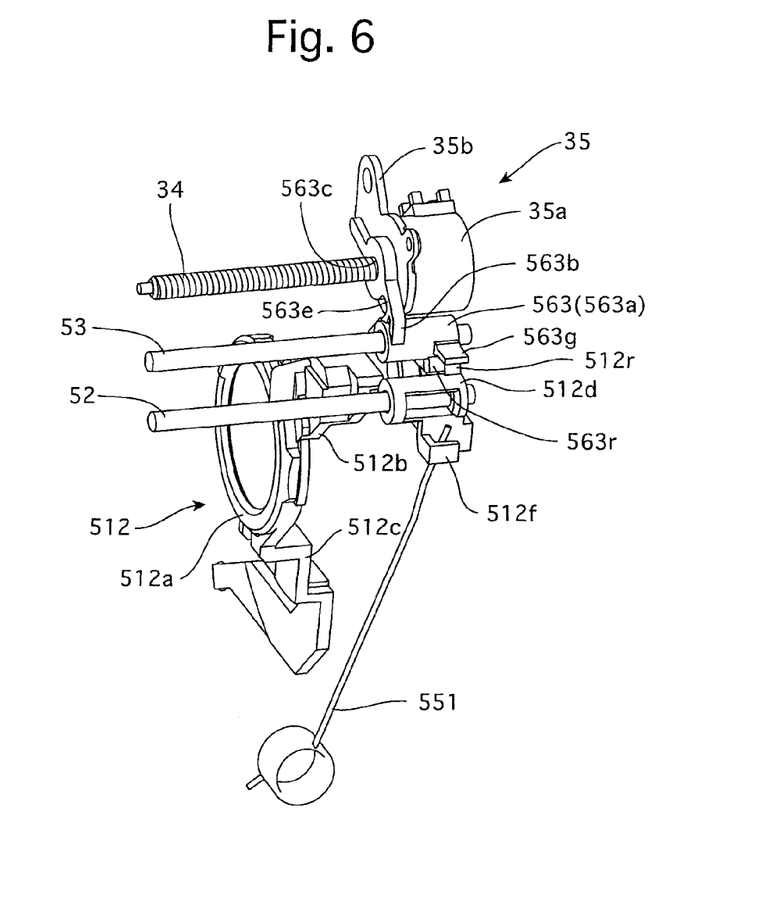
FIG. 6 is a perspective view of the main components of the third embodiment of the lens moving mechanism.
Figure 7:
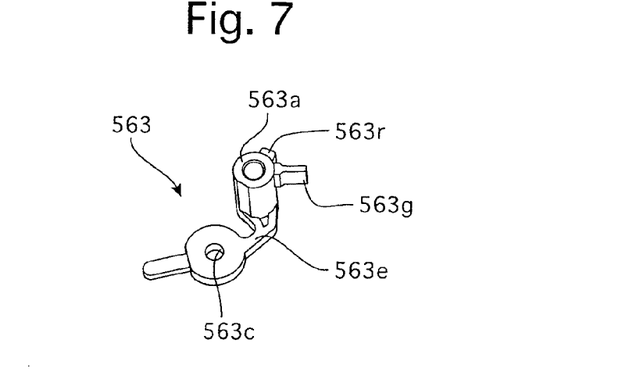
FIG. 7 is a perspective view of a motion transfer member that also serves as a nut member in the third embodiment of the lens moving mechanism.

A third embodiment of the lens moving mechanism according to the present invention will be hereinafter discussed with reference to FIGS. 3, 6 and 7. The third embodiment of the lens moving mechanism is different from the second embodiment of the lens moving mechanism in that third embodiment of the lens moving mechanism is provided with no lead nut member and that a female screw-engagement member (nut member) 563c, which is screw-engaged with the lead screw 34, is formed on a nut-incorporated intermediate transfer member (intermediate transfer member) 563. Elements of the third embodiment of the lens moving mechanism which are identical to those of the first and second embodiments of the lens moving mechanisms are designated by the same reference numerals, and the description of such elements is omitted from the following description.

The nut-incorporated intermediate transfer member 563 is provided with a cylindrical guide portion (fit-on portion) 563a, a nut-incorporated engaging arm 563b and the female screw-engagement member 563c. The transfer member guide shaft 53 is inserted into the cylindrical guide portion 563a to be slidable relative to the cylindrical guide portion 563a, the nut-incorporated engaging arm 563b extends radially from the cylindrical guide portion 563a, and the female screw-engagement member 563c is formed through the end of the nut-incorporated engaging arm 563b to be screw-engaged with the lead screw 34. The nut-incorporated engaging arm 563b is provided between the cylindrical guide portion 563a and the female screw-engagement member 563c with a constricted-shaped (narrow-width) deformable portion 563e (see FIGS. 6 and 7). The deformable portion 563e is resiliently deformed in a direction in which the cylindrical guide portion 563a and the female screw-engagement member 563c move toward and away from each other (a direction orthogonal to the photographing optical axis O, i.e., a direction in which the distance between the axes of the cylindrical guide portion 563a and the female screw-engagement member 563c varies), which makes it possible to ensure a smooth operation (movement in the optical axis direction) of the nut-incorporated intermediate transfer member 563 even in the case where a sufficient level of parallelism is not secured between the lead screw 34 and the transfer member guide shaft 53 or between the cylindrical guide portion 563a and the female screw-engagement member 563c. The deformation direction of the deformable portion 563e can be adjusted by changing the constricted shape and/or direction of the deformable portion 563e.

The lead screw 34, the fourth lens group guide shaft 52 and the transfer member guide shaft 53 that linearly guides the nut-incorporated intermediate transfer member 563 are positioned radially outside the first advancing barrel 15. The nut-incorporated intermediate transfer member 563 is further provided with an origin detection projection 563g which projects in a radial direction of the cylindrical guide portion 563a to detect the position (origin) of the nut-incorporated intermediate transfer member 563 in the optical axis direction in cooperation with an origin sensor (not shown) fixed to the stationary barrel 22. The position (origin) of the fourth lens group frame 512 in the optical axis direction can be detected by detecting the position (origin) of the origin detection projection 563g (the nut-incorporated intermediate transfer member 563) in the optical axis direction by the origin sensor.

The fourth lens group frame 512 is biased forward in the optical axis direction by the extension spring 55 (or the torsion spring 551) simply with the cylindrical guide portion 512d fitted on the fourth lens group guide shaft 52 to be slidable thereon, and the fourth lens group frame 512 is movable rearward in the optical axis direction against the biasing force of the extension spring 55. The fourth lens group frame 512 and the nut-incorporated intermediate transfer member 563 are provided with a one-way linkage projection 512r and a one-way linkage projection 563r, respectively, which come into contact with each other by the forward movement of the fourth lens group frame 512 that is caused by the biasing force of the extension spring 55 (or the torsion spring 551). The one-way linkage projection 512r and the one-way linkage projection 563r remain engaged with each other at all times by the spring force of the extension spring 55 in a state where no external force is exerted on the fourth lens group frame 512 (see FIGS. 3 and 6), whereas the fourth lens group frame 512 is movable independently of the nut-incorporated intermediate transfer member 563 when a rearward external force in the optical axis direction is exerted on the fourth lens group frame 512. In addition, a linear movement of the nut-incorporated intermediate transfer member 563 in the optical axis direction which is caused by a rotation of the lead screw 34 causes the fourth lens group frame 512 to move in the optical axis direction.

As described above, in the third embodiment of the lens moving mechanism, the transfer portion that follows the movement of the nut member (563c) is configured from the one-way linkage projection 512r of the fourth lens group frame 512 that comes in contact with the one-way linkage projection 563r of the nut-incorporated intermediate transfer member 563, and accordingly, it is possible for only the fourth lens group frame 512 to be removed with no need to remove the motor 35, and other surrounding components, when the fourth lens group LG4 is replaced by another fourth lens group after the zoom lens barrel 1 is assembled. In addition, since the female screw-engagement member 563c, which is screw-engaged with the lead screw 34, is formed on the nut-incorporated intermediate transfer member 563, the thickness (length) of the engaging portion (of the female screw-engagement member 563c) that is engaged with the lead screw 34 in the axial direction thereof becomes smaller than the engaging portion (of the lead nut member 542 and the screw insertion hole 56c) in the second embodiment of the lens moving mechanism, which makes the amount of movement of the engaging portion of the third embodiment on the lead screw 34 greater than that in the second embodiment of the lens moving mechanism. This makes it possible to reduce the length of the lead screw 34 if the second embodiment of the lens moving mechanism and the third embodiment of the lens moving mechanism were to have the same amount of movement of their respective engaging portions.

Although the present invention has been described with reference to the above described embodiments, in which the present invention is applied to the lens moving mechanism for moving the fourth lens group LG4 that serves as a focusing lens group, the present invention can also be applied to any movable lens group other than a focusing lens group. If the torsion spring 551 (see FIGS. 4, 5 and 6) is used instead of the extension spring 55 (see FIGS. 1, 2 and 3), the space for accommodating the extension spring 55 which extends in the optical axis direction becomes no longer necessary, which makes it possible to secure an effective distance through which the cylindrical guide portion 51d or 512d can move even if the stationary barrel 22 is not formed jutting forward in the optical axis direction. Although the fit-on portions of the fourth lens group frames 51 and 512 that are fitted on the fourth lens group guide shaft 52 are formed as the cylindrical guide portions 51d and 512d, respectively, each of the fit-on portions can be modified as a non-cylindrical portion having, e.g., a U-shaped or a round-shaped elongated hole in cross section.

Although the motor 35 is driven to rotate according to control information output from a controller in the above illustrated embodiments of the lens moving mechanisms according to the present invention, the control information includes control information for driving the motor 35 so as to move the fourth lens group LG4 to a position corresponding to object distance information measured by an object distance measuring device and also control information for driving the motor 35 so as to move the fourth lens group LG4 to an in-focus position which is detected by moving the fourth lens group LG4 between an infinite object-distance photographing position and a minimum object-distance photographing position in a camera equipped with a contrast detection type of autofocus system.

Obvious changes may be made in the specific embodiments of the present invention described herein, such modifications being within the spirit and scope of the invention claimed. It is indicated that all matter contained herein is illustrative and does not limit the scope of the present invention.

What is claimed is:
1. A lens moving mechanism comprising:
a guide shaft which extends in an optical axis direction;
a lens frame which is biased in said optical axis direction and includes a fit-on portion which is fitted onto said guide shaft; and
a lead screw which is formed directly on a drive shaft of a motor, which is driven to rotate in accordance with control information, said lead screw extending parallel to said guide shaft; and
a nut member which is screw-engaged with said lead screw while being prevented from rotating integrally with said lead screw, wherein said nut member moves forward and rearward in said optical axis direction relative to said lead screw in accordance with rotation of said lead screw,
wherein said lens frame comprises a transfer portion which follows movement of said nut member,
wherein an effective length of said guide shaft is greater than an effective length of said lead screw so that an end of said guide shaft and said motor overlap each other in said optical axis direction,
wherein at least part of said fit-on portion of said lens frame is positioned at a position where said end of said guide shaft and said motor overlap each other in said optical axis direction when said lens frame is positioned at one of opposite ends of a moving range of said lens frame, and
wherein said at least part of said fit-on portion of said lens frame is positioned to face said lead screw in a direction orthogonal to said optical axis when said lens frame is positioned at the other of said opposite ends of said moving range of said lens frame.

2. The lens moving mechanism according to claim 1, wherein said fit-on portion is greater in length in said optical axis direction than said transfer portion.

3. The lens moving mechanism according to claim 1, wherein said transfer portion comprises a motion transfer arm which is formed integral with said lens frame and has a hole into which said lead screw is loosely fitted, and wherein said motion transfer arm is in contact with said nut member.

4. The lens moving mechanism according to claim 1, further comprising: a transfer member guide shaft which extends parallel to said guide shaft; and an intermediate transfer member which is formed separately from said lens frame and movably guided in said optical axis direction by said transfer member guide shaft.

5. The lens moving mechanism according to claim 4, wherein said transfer portion is in contact with said intermediate transfer member and follows the movement of said nut member.

6. The lens moving mechanism according to claim 4, wherein said intermediate transfer member is provided with a hole through which said lead screw is loosely fitted.

7. The lens moving mechanism according to claim 4, wherein said intermediate transfer member comprises a nut-incorporated intermediate transfer member with which said nut member is integrally formed, and
wherein said transfer portion is in contact with said nut-incorporated intermediate transfer member and follows the movement of said nut-incorporated intermediate transfer member.

8. The lens moving mechanism according to claim 7, wherein said nut-incorporated intermediate transfer member comprises:
a fit-on portion which is fitted on said transfer member guide shaft; and
a deformable portion via which said nut member and said portion are connected to each other.

9. The lens moving mechanism according to claim 8, wherein said deformable portion is resiliently deformed in a direction orthogonal to said optical axis direction in which said nut member and said fit-on portion of said nut-incorporated intermediate transfer member move toward and away from each other.

10. The lens moving mechanism according to claim 1, wherein said lens frame supports a rearmost lens group of a plurality of lens groups of a lens system, said rearmost lens group serving as a focusing lens group.

11. The lens moving mechanism according to claim 1, wherein said motor is fixed to a stationary member so that said lead screw extends forward.

12. The lens moving mechanism according to claim 4, wherein said transfer member guide shaft is positioned so that an end thereof and said motor overlap each other in said optical axis direction.

13. The lens moving mechanism according to claim 4, wherein said intermediate transfer member comprises a fit-on portion which is fitted on said transfer member guide shaft and extends in an axial direction thereof.

* * * * *